United States Patent [19]

Hata

[11] Patent Number: 4,743,329
[45] Date of Patent: May 10, 1988

[54] PROCESS FOR MANUFACTURING OF COMPOSITE PIPES

[75] Inventor: Ryosuke Hata, Osaka, Japan

[73] Assignee: Sumitomo Electric Industries, Ltd., Japan

[21] Appl. No.: 831,348

[22] Filed: Feb. 20, 1986

[30] Foreign Application Priority Data

Feb. 22, 1985 [JP] Japan .................................. 60-34800

[51] Int. Cl.$^4$ ............................................ B32B 31/00
[52] U.S. Cl. .................................... 156/287; 138/143;
156/293; 427/230; 427/238; 428/36; 428/457;
428/458; 428/461; 428/462
[58] Field of Search .................... 428/35, 36, 457, 458,
428/461, 462; 156/287, 293; 427/230, 238;
138/143

[56] References Cited

U.S. PATENT DOCUMENTS 3,862,418 1/1975 Preiss ................... 250/267
4,144,111 3/1979 Schaerer ........................ 156/244.14
4,370,186 1/1983 Blandin et al. ................. 156/244.14

Primary Examiner—Stephen J. Lechert, Jr.
Attorney, Agent, or Firm—Harness, Dickey & Pierce

[57] ABSTRACT

Improved composite pipes are proposed which comprise an outer pipe made of plastic and a thin lead layer on the inner wall of the outer pipe. The lead layer is formed by arranging a lead pipe in the outer pipe and expanding it by use of pressure medium into close contact with the inner wall of the outer pipe. The outer pipe may be circular or square or double-path. A process for producing the composite pipes is also proposed.

14 Claims, 2 Drawing Sheets

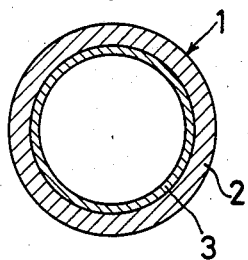
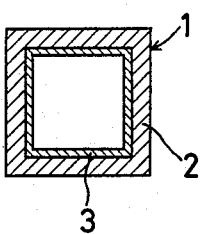
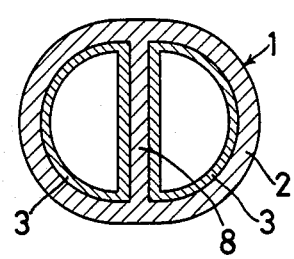
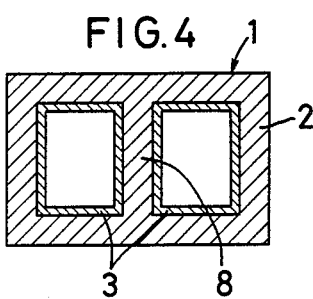
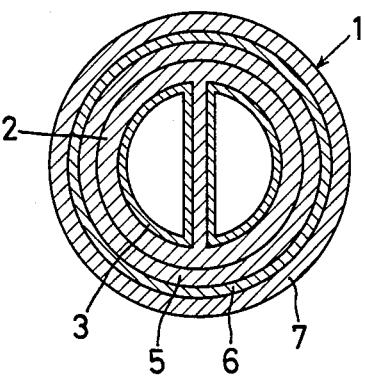
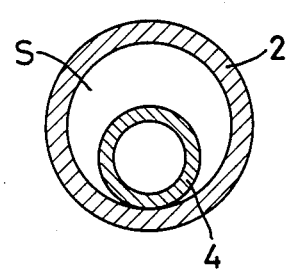
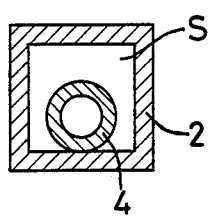
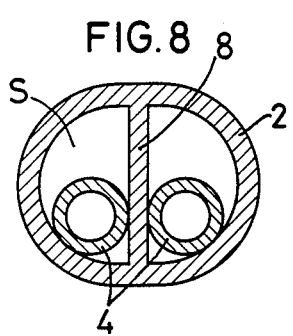
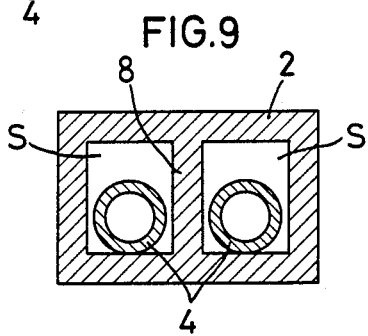

PROCESS FOR MANUFACTURING OF COMPOSITE PIPES

The present invention relates to composite pipes used for supplying or transporting water, gas, chemicals, etc. and to a process for manufacturing the same.

Pipes of plastic such as polyethylene pipes and lead pipes have so far been used for the purpose of supplying water or gas or transporting chemicals, etc. However, these pipes have the following shortcomings. Lead pipes have an insufficient strength. Plastic pipes are inferior in resistance to chemical and resistance to radio-activity. Also, plastic pipes are slightly permeable to water and gas, and thus inferior in air tightness. Further, because of decreased in strength at high temperature, it is difficult to use a plastic pipe to feed hot water or steam at 80°-100° C. or higher.

In order to solve this problem, composite pipes have been conceived which are formed by combining a lead pipe, which is excellent in resistance to chemicals, resistance to radioactivity, non-permeability to water, and mechanical strength at high temperature, with a plastic pipe, which is excellent in resistance to pressure and corrosion resistance. However, it is difficult to coat the inner wall of a plastic pipe with lead. Therefore, such composite pipes have been produced by coating with plastic the outer surface of a lead pipe which has a relatively small inner diameter (e.g. 25 mm) and is thick (e.g. 2-5 mm for a pipe with 25 mm inner diameter).

With this prior art process, the lead pipe to be coated with plastic has to have a thickness of 2 mm or more for form retention. (Even if the thickness of the lead pipe is over 2 mm, it is difficult to obtain a lead pipe having a high roundness and a large inner diameter of e.g. 50 mm or more without any deformation.) This makes the final product heavy and expensive. Further, it was difficult to produce large-diameter composite pipes having a high roundness with this prior art process.

An object of the present invention is to provide a composite pipe which obviates the aforesaid shortcomings.

Another object of the present invention is to provide a process for manufacturing such composite pipe.

In accordance with the present invention, there is provided a composite pipe which comprises an outer pipe made of plastic and a thin lead layer on the inner wall of the plastic pipe, the lead layer being formed by expanding a lead pipe arranged in the outer pipe into close contact with the inner wall of the outer pipe.

The composite pipe according to the present invention is excellent in resistance to chemicals and resistance to radioactivity and in air tightness, flexibility and mechanical strength at high temperature and is light in weight and inexpensive because it has a thin lead layer inside of the outer pipe. Even at high temperatures of 100°-200° C., the mechanical strength is maintained at a sufficiently high level for actual use. Even though the lead layer is thin, the composite pipe is also excellent in resistance to pressure, resistance to marring, form retention and corrosion resistance thanks to the outer plastic pipe outside of the lead layer.

Lead (and lead alloys) as a metal has a melting point of over 300° C. and flexibility, and particularly a high elongation of 45-50 % against about 33 % for aluminum which is generally used as flexible pipes (and as a metal sheath for power cables). Thanks to the high elongation, aluminum can be uniformly extended easily by applying a tensile force at relatively low temperature from normal temperature to e.g. 150° C. Lead is an extremely peculiar metal in this point. But, lead is much poorer than aluminum in mechanical strength (lead has a tensile strength of 1.8-2.5 kg/mm$^2$ against 8.5 kg/mm$^2$ for aluminum). The present invention aims to provide extremely useful composite pipes by ulilizing the advantageous properties of aluminum to expand a lead pipe and by using a plastic pipe as an outer pipe to compensate for poor mechanical strength of lead.

Plastic pipes are apt to deform and excellent in restorability and resistance to bending. But, for metal pipes such as lead pipes, there is a limit for the wall thickness in relation to a given inner (or outer) diameter in order to ensure that buckling does not occur. The relationship between them is represented by the following L.G. Brazor's equation $$\frac{3r^4}{2t^2} K^3 - \frac{2\sqrt{2t}}{9r^2} = 0$$

wherein
t: wall thickness of pipe
r: outer radius of pipe
1/K: minimum theoretical bending radius The graph of FIG. 10 shows the relationship between the outer diameter of pipe and its wall thickness determined by use of the L.G. Brazor's equation. The equation means that the larger the wall thickness, the larger the minimum allowable bending radius. Thus, the thinner the lead pipe is, the better. However, in producing lead pipes, the thinner and the larger in diameter, the more apt to deform and the more difficult to maintain the roundness the lead pipes are.

The inventor of the present invention succeeded in providing composite pipes having a large diameter of e.g. 50 to 150 mm (so far impossible for the aforesaid reason) and an inner lead pipe as thin as 1-3 mm by arranging a lead pipe in an outer plastic pipe having a required wall thickness and expanding the lead pipe into close contact with the inner wall of the outer pipe. In other words, he succeeded in decreasing the wall thickness of the metal pipe and thus the composite pipe, thereby decreasing the allowable bending radius and thus improving the flexibility.

In view of the fact that a major problem in making the pipes of this type seamless and very elongate was difficulty in transporting such pipes, decreasing the bending radius (for winding a pipe around a drum for transportation) to about 1/25 to 1/30 (in outer radius) means increasing the transportable pipe length about twice or more. This marked effect results from decrease in wall thickness of pipe, as will be understood from the graph of FIG. 10.

In accordance with the present invention, there is provided a process for manufacturing a composite pipe which comprises the steps of arranging a lead pipe in a pipe made of plastic with some gap therebetween, and expanding the lead pipe by sealing a pressure medium in the lead pipe until it gets into close contact with the inner wall of the pipe of plastic to form a lead layer.

For short pipes, a lead pipe may be inserted into a pipe of plastic formed beforehand. For elongated pipes, a lead pipe may be fed to a continuous extruder where a pipe of plastic is extruded while enclosing the lead pipe as a core.

With the process according to the present invention, composite pipes having a thin lead layer on the inner wall of a pipe of plastic can be easily produced.

Other objects and advantages of the present invention will become apparent from the following description taken with reference to the accompanying drawings, in which:

FIGS. 1–5 are sectional views of composite pipes embodying the present invention;

FIGS. 6–9 are sectional views corresponding to the embodiments of FIGS. 1–4, respectively, but with the lead pipe not expanded yet.

Figure 10:
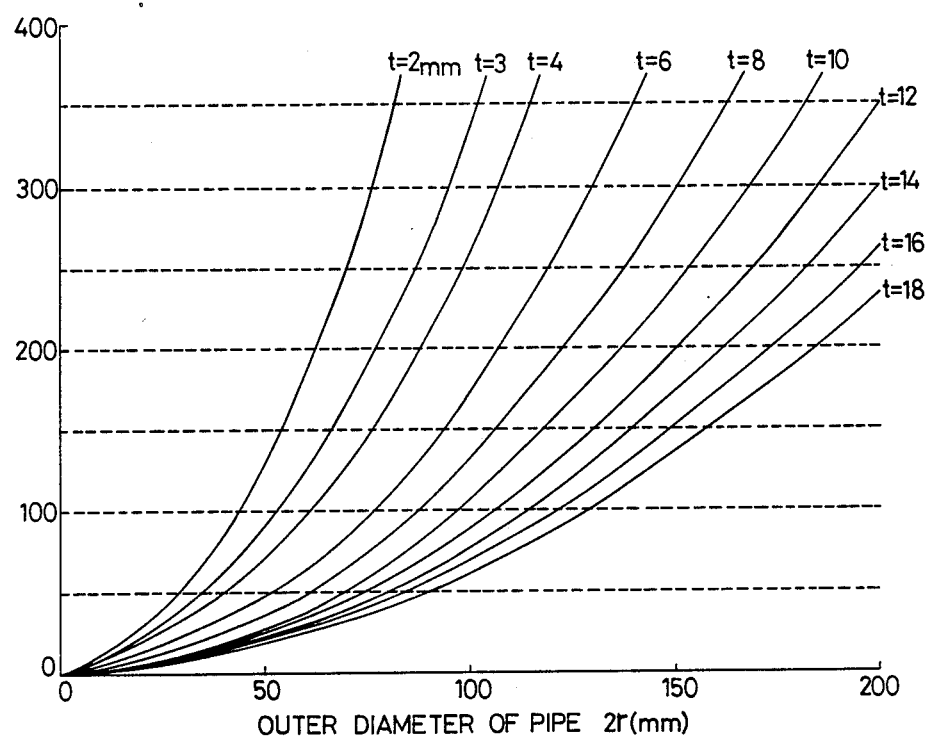
FIG. 10 is a graph showing the relationship between the outer diameter and the thickness of the pipe.

A composite pipe 1 in accordance with the present invention comprises an outer pipe 2 made of plastic such as polyethylene and polyvinyl chloride and a thin lead layer 3 disposed in close contact with the inner wall of the outer pipe, the lead layer 3 being formed by expanding a lead pipe 4.

In the embodiment of FIG. 1, the pipe 1 is of a circular section whereas in the embodiment of FIG. 2 it is of a square section. Square pipes have advantages that they can be laid in buildings with a minimum waste of space in relation to the other structure and that they can be stably supported on a flat wall surface.

In the embodiment of FIG. 3, the pipe 2 is round, and is divided by an axially extending partition 8 into two paths or chambers of a semi-circular section. In each of these two chambers, a lead layer 3 is formed in close contact with the inner wall of the chamber.

In the embodiment of FIG. 4, the pipe 2 is square and is divided by an axially extending partition 8 into two chambers or paths of a square section. In each of these two chambers, a lead layer 3 is formed in close contact with the inner wall of the chamber.

The embodiment of FIG. 5 is similar to the embodiment of FIG. 3, but further comprises a heat insulation layer 5 made of a heat insulation material such as glass wool, asbestos and foamed plastic and arranged outside of the pipe 2, a protective layer 6 made of aluminum or stainless steel and arranged outside of the layer 5, and a corrosion protecting layer 7 made of polyethylene or polyvinyl chloride and arranged outside of the layer 6. The protective layer 6 may be corrugated.

The composite pipes 1 according to the present invention may be produced by the following process.

Firstly, a lead pipe 4 is extruded by use of a continuous lead extruder. The lead pipe 4 is then fed to a continuous synthetic resin extruder by which a pipe 2 made of plastic such as polyethylene and polyvinyl chloride is extruded continuously while enclosing the lead pipe 4 as a core with some space S between the pipe 2 and the lead pipe 4, as shown in FIGS. 6, 7, 8 and 9. Both ends of the lead pipe 4 are then sealed and pressure medium such as gas or liquid is forced into the lead pipe 4 to expand it into close contact with the inner wall of the pipe 2. Simultaneously air in the space between the pipe 2 and the lead pipe 4 is extracted by vacuum.

In expanding the lead pipe 4, it should be heated beforehand to a temperature of 150° C. or less. If it was heated to a higher temperature, the strength of the lead pipe could deteriorate and its locally weak points could get damaged by the pressure applied from inside. Also, such a high temperature could deteriorate the outer pipe 2 of plastic.

The internal pressure applied for expanding the lead pipe 4 should be not higher than 50 kg/cm$^2$, so that the outer pipe 2 will not be deformed even if it has a large diameter. The highest allowable pressure should be selected by use of the known equation (P=$\gamma$/r, t wherein P: internal pressure in kg/cm$^2$, t: wall thickness in cm, r': inner radius in cm, $\gamma$: allowable stress in kg/cm$^2$) so that it will be below the breaking tensile strength.

As for the manner of applying the internal pressure, because applying it to a final pressure at a time could damage the locally weak points of the lead pipe, it is preferable to increase the internal pressure step by step up to the allowable highest pressure, e.g. 5 kg/cm$^2$ for one hour, then 10 kg/cm$^2$ for one hour, and then 15 kg/cm$^2$ for one hour.

If the composite pipe 1 is relatively short, it may be produced by forming the outer pipe 2 and the lead pipe 4 separately beforehand, inserting the lead pipe into the outer pipe, and expanding the lead pipe.

Composite pipes of a square or two-path cross-section as shown in FIGS. 2, 3 and 4 have been very difficult to manufacture. In accordance with the present invention, such composite pipes can be easily manufactured to any desired length by firstly forming a lead pipe or pipes 4 of a circular section, extruding a pipe 2 of plastic by means of an extruder while enclosing the lead pipe 4 inserted as a core, as shown in FIGS. 7, 8 and 9, and filling the lead pipe 4 with pressure medium to expand it into close contact with the inner wall of the outer pipe 2.

By the abovesaid process, for example, a lead pipe 4 having a thickness of 2 mm can be expanded to form a thin lead layer having a thickness of 1 mm or less in contact with the inner wall of the outer pipe 2.

The material of the outer pipe is not intended to limit to polyethylene and polyvinyl chloride. It may be polybutene, crosslinked polyethylene, high-density polyethylene, polypropyrene, heat-resistant polyvinyl chloride, polymethylpentene, etc. These plastics may be used according to the use. The material of the outer plastic pipe should be selected in view of the cost, working temperature, resistance to external pressure such as soil pressure, and heat insulation. As for the working temperature, polyethylene, polyvinyl chloride and high-density polyethylene are preferable for low and medium temperature, e.g. −50° C. to 80° C., and polybutene, cross-linked polyethylene, polypropyrene, heat-resistant polyvinyl chloride and polymethylpentene are preferable for use at high temperature such as 80°–120° C. As for heat insulation, polybutene is superior to polyethylenes about twice. Polyethylene and polyvinyl chloride are almost the same, but the latter is slightly better.

Since the outer pipe is made of plastic, the composite pipe of the present invention can be manufactured by extrusion in the form of a seamless elongated pipe. The composite pipe as a whole has an excellent flexibility because it is seamless and thin. Thus, it can be transported wound around a drum for a larger length and can be laid bent with a smaller radius of curvature.

Thus, the composite pipe according to the present invention can be used for a variety of applications such as at oil producing plants, as water pipes or steam pipes, as containers of elongated heat pipes, as freezing preventive pipes, in ships, at atomic power plants, in factories, etc.

With the process according to the present invention, since the lead layer is formed by expanding a lead pipe, a thin lead layer can be formed stably and seamlessly to the shape of the outer pipe. Since the outer pipe and the lead pipe can be formed by extrusion, composite pipes having a large diameter and a high roundness can be produced. Also, composite pipes having a square cross-section or having two chambers extending axially can be produced.

The process according to the present invention makes a good use of the advantageous properties of lead: high elongation, uniformly expansible at relatively low temperatures under a relatively small internal pressure, and intrisically flexible.

In the process of the present invention, the wall thickness of the composite pipe can be decreased by expanding a lead pipe arranged in an outer pipe. This makes it possible to decrease the bending radius, thereby decrease the diameter of the drum on which the pipe is wound, increase the length of pipe which can be transported, and transport a very long pipe. Also, the decrease in bending radius has a great effect in laying the pipe.

What we claim:

1. A process for producing a composite pipe comprising steps of arranging a lead pipe in an outer pipe made of plastic with some gap therebetween, and expanding the lead pipe by sealing a pressure medium in said lead pipe until it gets into close contact with the inner wall of said outer pipe to form a lead layer.

2. A process as claim in claim 1, wherein said lead pipe is arranged in said outer pipe by forming said lead pipe and said outer pipe separately and inserting said lead pipe into said outer pipe.

3. A process as claimed in claim 1, wherein said lead pipe is arranged in said outer pipe by forming a lead pipe, feeding said lead pipe to a continuous extruder, and extruding said outer pipe thereby while enclosing said lead pipe as a core.

4. A process as claimed in claim 1, wherein both of said outer pipe and said lead pipe are formed by a continuous extrusion.

5. A process as claimed in claim 1, wherein the thickness of said lead pipe prior to expansion is not less than 2 mm.

6. A process as claimed in claim 1, wherein the thickness of said lead layer is not more than 1 mm.

7. A process as claimed in claim 1, wherein said lead pipe is heated to a temperature not higher than 150° C. before expanding it.

8. A process for producing a composite pipe comprising steps of arranging a lead pipe in an outer pipe made of plastic with some gap therebetween, and expanding the lead pipe when inserted into the outer pipe until said lead pipe expands into close contact with the inner wall of said outer pipe to form a lead layer thereupon.

9. A process as claimed in claim 8, wherein said lead pipe is arranged in said outer pipe by forming said lead pipe and said outer pipe separately and inserting said lead pipe into said outer pipe.

10. A process as claimed in claim 8, wherein said lead pipe is arranged in said outer pipe by forming a lead pipe, feeding said lead pipe to a continuous extruder, and extruding said outer pipe thereby while enclosing said lead pipe as a core.

11. A process as claimed in claim 8, wherein both of said outer pipe and said lead pipe are formed by a continuous extrusion.

12. A process as claimed in claim 8 wherein the thickness of said lead pipe prior to expansion is not less than 2 mm.

13. A process as claimed in claim 8, wherein the thickness of said lead layer is not more than 1 mm.

14. A process as claimed in claim 8 wherein said lead pipe is heated to a temperature not higher than 150° C. before expanding it.

* * * * *